(No Model.) 2 Sheets—Sheet 2.
H. DOLLMAN.
MACHINE FOR MINCING MEAT.
No. 309,381. Patented Dec. 16, 1884.
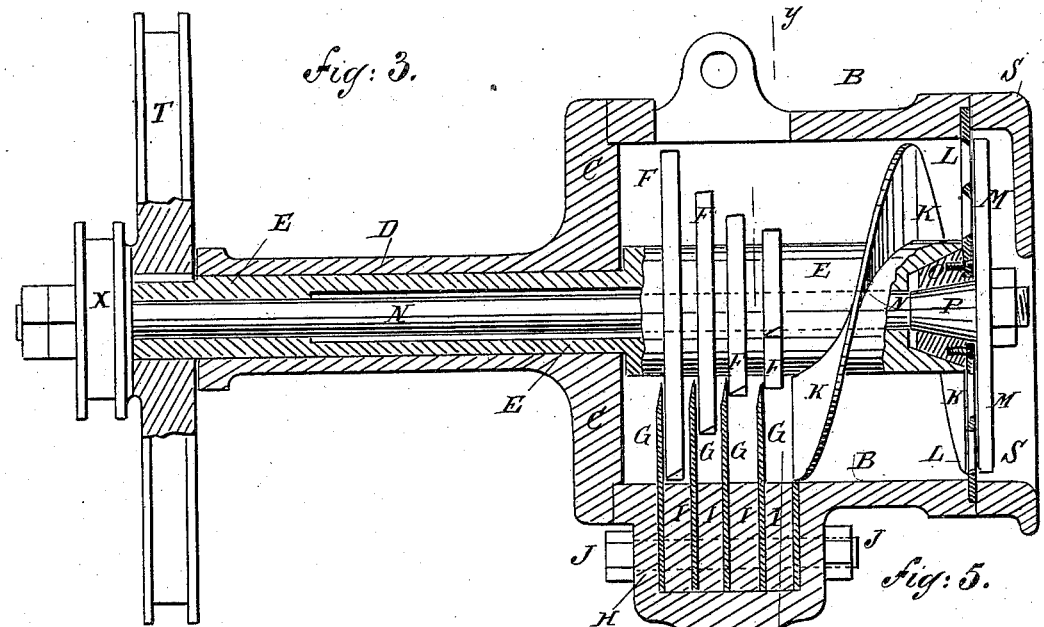
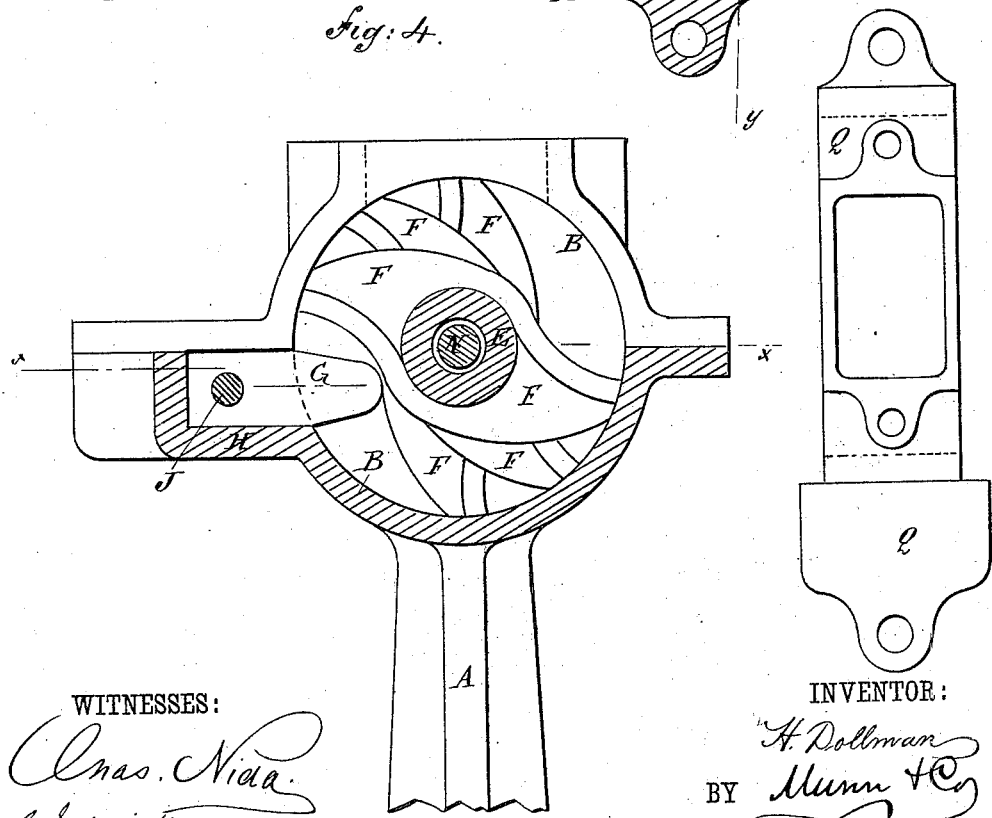
WITNESSES:
Chas. Nida
C. Sedgwick
INVENTOR:
H. Dollman
BY Munn & Co
ATTORNEYS.

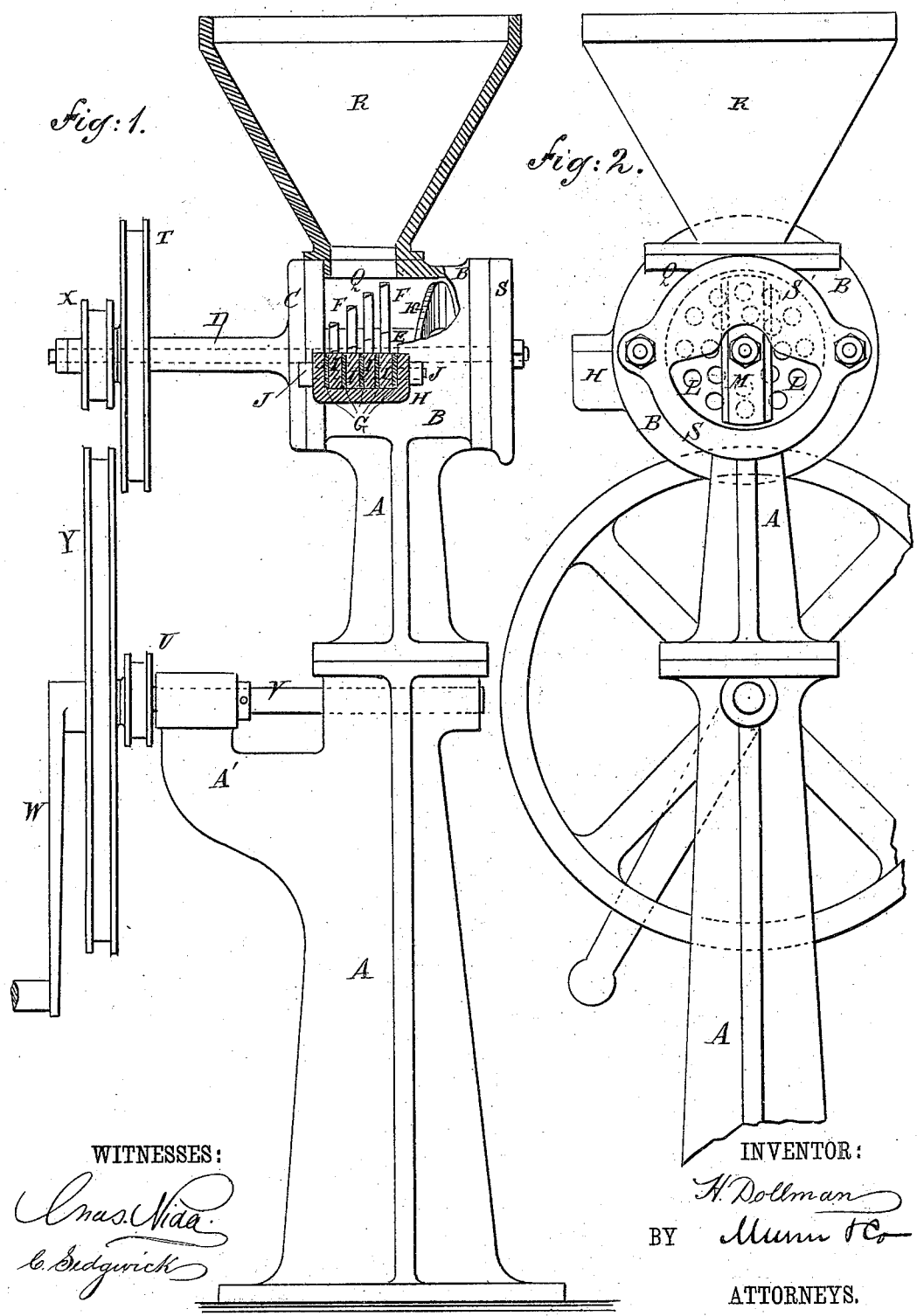

UNITED STATES PATENT OFFICE.

HUBERT DOLLMAN, OF BIRMINGHAM, COUNTY OF WARWICK, ENGLAND.

MACHINE FOR MINCING MEAT.

SPECIFICATION forming part of Letters Patent No. 309,381, dated December 16, 1884.

Application filed January 24, 1884. (No model.) Patented in England July 5, 1881, No. 2,939.

*To all whom it may concern:*

Be it known that I, HUBERT DOLLMAN, of Birmingham, in the county of Warwick, England, have invented a new and useful Improvement in Machines for Mincing Meat and other Substances, (for which I have obtained an English patent numbered 2,939, and dated July 5, 1881,) of which the following is a full, clear, and exact description.

Reference is to be had to the accompanying drawings, forming a part of this specification, in which similar letters of reference indicate corresponding parts in all the figures.

Figure 1, Sheet 1, is a side elevation of my improved machine partly in section and part being broken away. Fig. 2, Sheet 1, is a front elevation of the same. Fig. 3, Sheet 2, is a sectional plan view of the same, taken through the line $x\ x$, Fig. 4, part being broken away. Fig. 4, Sheet 2, is a sectional front elevation of the same, taken through the line $y\ y$, Fig. 3. Fig. 5, Sheet 2, is a plan view of the cover of the machine.

The object of this invention is to provide machines for mincing meat and other substances, constructed in such a manner that they will be efficient in operation and convenient in use.

The invention consists in the construction and arrangement of parts, as will be hereinafter fully described and claimed.

A represents a stand of convenient height, upon the upper end of which is formed a hollow cylinder or case, B. The rear end of the cylinder B is closed by a plate C, upon which is formed an outwardly-projecting hollow arm, D, to serve as a long bearing for the hollow shaft E.

To the hollow shaft E, within the rear part of the cylinder B, and for about half the length of the said cylinder, are secured knives or cutters F, of such a length that their outer ends will be close to the inner surface of the cylinder B, as shown in Fig. 4. The knives F are slightly curved, and are arranged spirally upon the shaft E, so as to operate successively upon the substance to be cut. The knives F pass between stationary knives G, the shanks of which are inserted in a recess in an extension, H, formed upon one side of the rear part of the cylinder B, where they are kept at the proper distance apart by blocks I, interposed between them, the said knives and blocks being secured in place by a bolt, J, passing through them and through the walls of the extension H, as shown in Figs. 3 and 4.

To the forward part of the hollow shaft E is attached or upon it is formed a spiral flange, K, to serve as an Archimedean screw, to feed the cut meat or other substance to the forward end of the cylinder B, and force it through the perforations of the plate L, of hardened and tempered steel, secured to the said forward end of the cylinder B. The perforations through the plate L are made conical or tapering, and with their smaller ends outward, so that the edges of the said plate L at the outer ends of the said perforations will serve as knives to cut the meat as it is forced through the said perforations, and is operated upon by the radial knife or knives M, secured to the forward end of the shaft N, which passes through and revolves in the interior of the hollow shaft E.

To the inner side of the center of the perforated plate L is secured, by screws or other suitable means, or upon it is formed, a hub, O, which is made conical, and fits into a conical countersink in the end of the hollow shaft E to form a bearing for the said end. The interior of the conical hub O is made conical, and into it fits the conical enlargement P, formed upon the shaft N, to give steadiness of movement to the shafts E N. The upper part of the cylinder B and of the recess H is left open to give convenient access to the knives F G, and is provided with a cover, Q, having a hopper, R, attached to it around an opening in its upper middle part. The perforated plate L and the knife or knives M are covered by a plate, S, having an opening in its lower part for the escape of the minced substance. The rear end of the tubular shaft E projects a little beyond the tubular arm D, and has a large band or chain pulley, T, attached to it to receive an endless band or chain, which also passes around a small band or chain pulley, U, attached to the shaft V, which revolves in bearings in the stand A, and in an arm, A', formed upon the said stand, and which has a crank, W, attached to it when the machine is to be driven by hand, and a band or chain pulley when the machine is to be driven by some other power. The rear end of the shaft N projects a little beyond the end of the hollow shaft E, and has a small band or chain pulley, X, attached to it to receive a band or chain, which also passes around a large band or chain wheel, Y, attached to the drive-shaft V. With this construction, when the shaft V is revolved the hollow shaft E and its knives F and spiral flange K will be revolved with a slow movement, and the shaft N and its knife or knives M will be revolved with a rapid movement.

In using the machine the meat or other substance is fed into the machine through the hopper R, is cut into small pieces by the knives F G, and is then fed forward by the spiral flange K, is forced out through the perforations of the plate L, is cut off at the outer side of the said plate L by the knife or knives M, and is discharged through the opening in the plate S into some suitable receiver.

I am aware that a meat-cutter has been heretofore constructed with a cylinder provided with knives, a perforated end plate, a shaft passing through the said cylinder and provided with knives, an endless screw, and a knife operating against the outer face of said perforated cylinder, and I do not claim such as my invention.

Having thus described my invention, I claim as new and desire to secure by Letters Patent—

1. The combination, with the hollow shaft and cylinder, the screw carried thereby, and the perforated end plate, of the internal shaft, the knife carried at the end thereof, and mechanism, substantially as described, for rotating the independent shafts at different rates of speed, substantially as set forth.

2. A mincing-machine constructed substantially as here shown and described, and consisting of the hollow cylinder B, having stationary knives G, the hollow shaft E, having radial knives F and spiral flange K, the perforated plate L, the interior shaft N, having radial knife or knives M, and a driving mechanism constructed to rotate the two shafts at different rates of speed, the parts being combined as set forth.

3. In a mincing-machine, the combination, with the perforated plate L, the hollow shaft E, having conical countersink in its forward end, and the interior shaft N, having conical enlargement P, of the conical hub O, having conical interior, substantially as herein shown and described, whereby steadiness of motion is given to the said shafts, as set forth.

HUBERT DOLLMAN.

Witnesses:
 JOSIAH LONGMORE,
 FREDERICK ROBERTS.